E. SCHNEIDER.
WHEELED AXLE FOR GUN CARRIAGES AND OTHER VEHICLES SUSPENDED ON SPRINGS.
APPLICATION FILED FEB. 28, 1920.
1,374,238.
Patented Apr. 12, 1921.
8 SHEETS—SHEET 1.
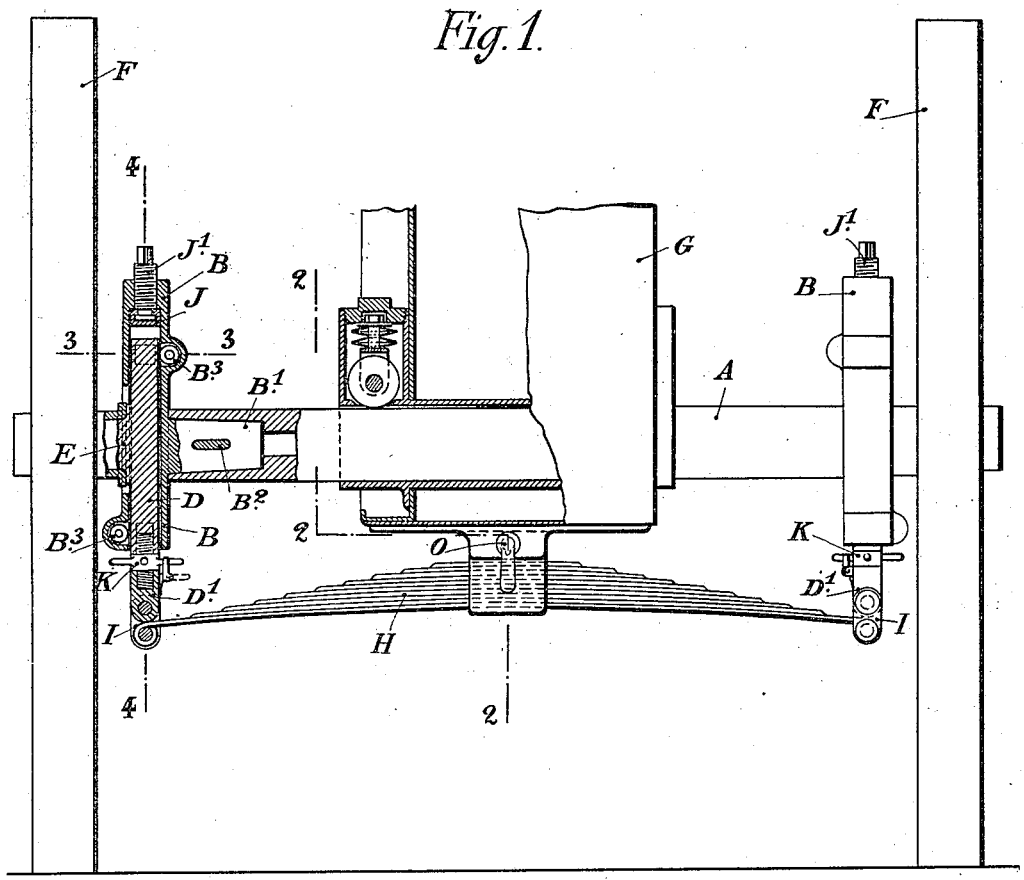
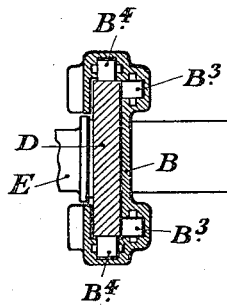

E. SCHNEIDER.
WHEELED AXLE FOR GUN CARRIAGES AND OTHER VEHICLES SUSPENDED ON SPRINGS.
APPLICATION FILED FEB. 28, 1920.

1,374,238.

Patented Apr. 12, 1921.
8 SHEETS—SHEET 2.

Inventor,-
Eugene Schneider
By Mauro, Cameron, Lewis & Kerkam
Attorneys

E. SCHNEIDER.
WHEELED AXLE FOR GUN CARRIAGES AND OTHER VEHICLES SUSPENDED ON SPRINGS.
APPLICATION FILED FEB. 28, 1920.

1,374,238.

Patented Apr. 12, 1921.
8 SHEETS—SHEET 4.

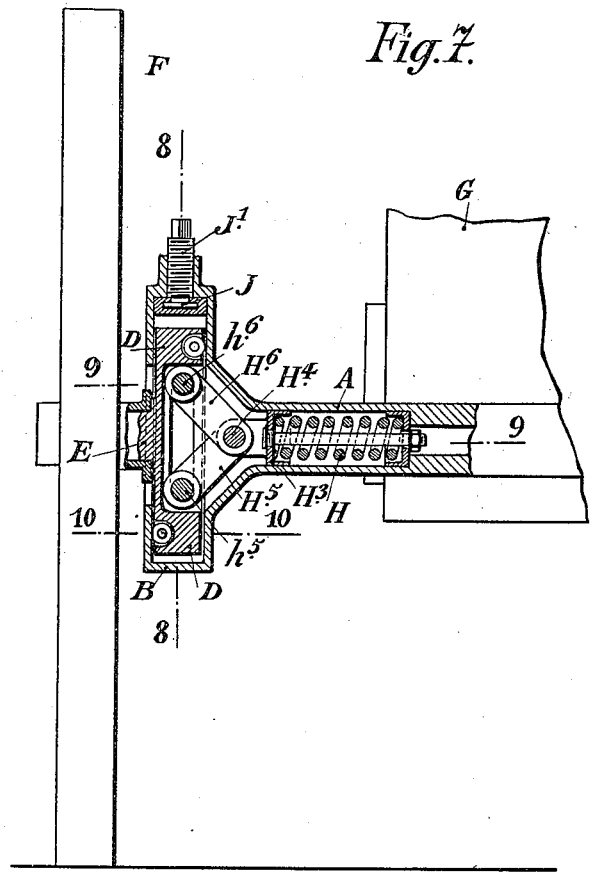
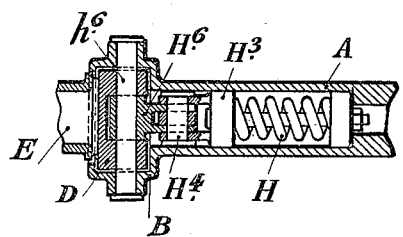

E. SCHNEIDER.
WHEELED AXLE FOR GUN CARRIAGES AND OTHER VEHICLES SUSPENDED ON SPRINGS.
APPLICATION FILED FEB. 28, 1920.

E. SCHNEIDER.
WHEELED AXLE FOR GUN CARRIAGES AND OTHER VEHICLES SUSPENDED ON SPRINGS.
APPLICATION FILED FEB. 28, 1920.

1,374,238.

Patented Apr. 12, 1921.

E. SCHNEIDER.
WHEELED AXLE FOR GUN CARRIAGES AND OTHER VEHICLES SUSPENDED ON SPRINGS.
APPLICATION FILED FEB. 28, 1920.

1,374,238.

Patented Apr. 12, 1921.
8 SHEETS—SHEET 8.

UNITED STATES PATENT OFFICE.

EUGÈNE SCHNEIDER, OF PARIS, FRANCE, ASSIGNOR TO SCHNEIDER & CIE., OF PARIS, FRANCE, A JOINT-STOCK COMPANY OF FRANCE.

WHEELED AXLE FOR GUN-CARRIAGES AND OTHER VEHICLES SUSPENDED ON SPRINGS.

1,374,238.      Specification of Letters Patent.      Patented Apr. 12, 1921.

Application filed February 28, 1920. Serial No. 362,117.

*To all whom it may concern:*

Be it known that I, EUGÈNE SCHNEIDER, of 42 Rue d'Anjou, Paris, France, have invented new and useful Improvements in Wheeled Axles for Gun-Carriages and other Vehicles Suspended on Springs, which invention is fully set forth in the following specification.

This invention has for its object to provide an improved wheeled axle, more particularly designed for use in heavy vehicles such as gun carriages.

The improved wheeled axle is constructed to afford an elastic suspension of the gun carriage or the chassis or framing of the vehicle. The characteristic feature of the improved wheeled axle consists in that the axle is subdivided into a main central portion and two journals carrying the wheels, the said journals being guided vertically in the ends of the said main portion. The spring suspension device is arranged between the vertically movable journals and its independent main axle portion or between the journals and the carriage body or chassis of the vehicles which in all cases rests directly upon the said main axial portion. Owing to this subdivision of the axle and the spring connection between the main central axle portion and the two end portions or journals of the axle, these two end portions are capable of yielding independently of each other relatively to the main axle portion that carries the load.

Various examples of the application and construction of this invention are illustrated in the accompanying drawings in which:

Figures 1 to 4 illustrate the application of this invention to a wheeled axle for use with a gun carriage that is capable of sliding along the main axle portion for the purpose of training the gun.

Fig. 1 is a side elevation of the axle partly in axial section.

Fig. 2 is a cross section on the line 2—2 of Fig. 1.

Figure 2:
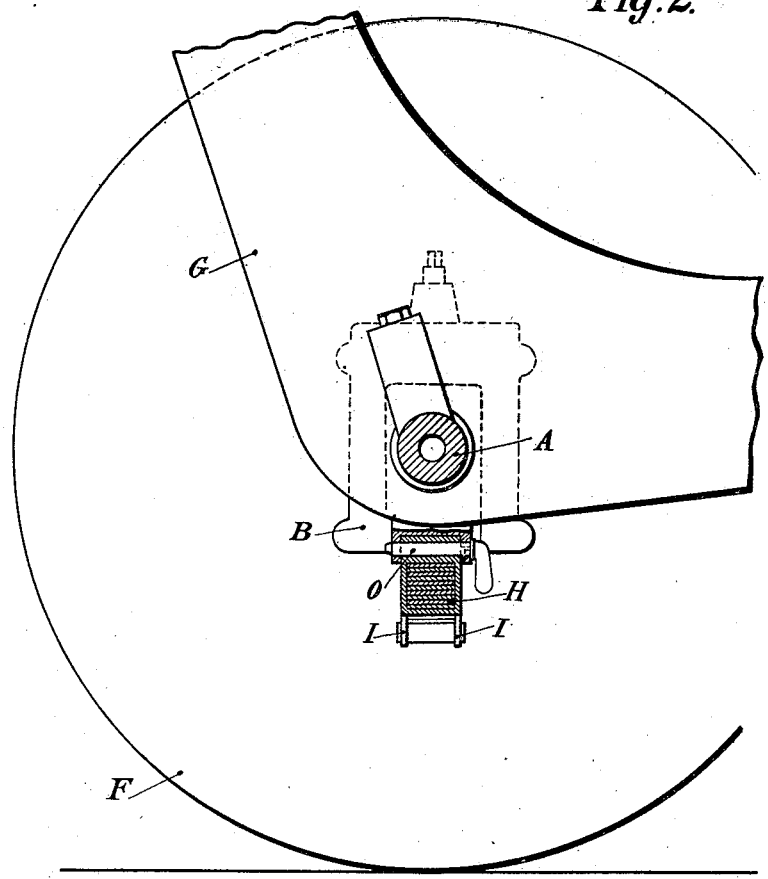
Figure 4:
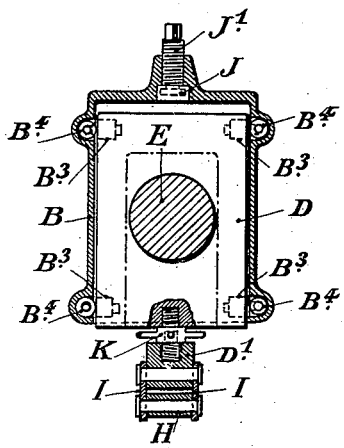

Figs. 3 and 4 are sections respectively on the lines 3—3 and 4—4 of Fig. 1.

Figure 5:
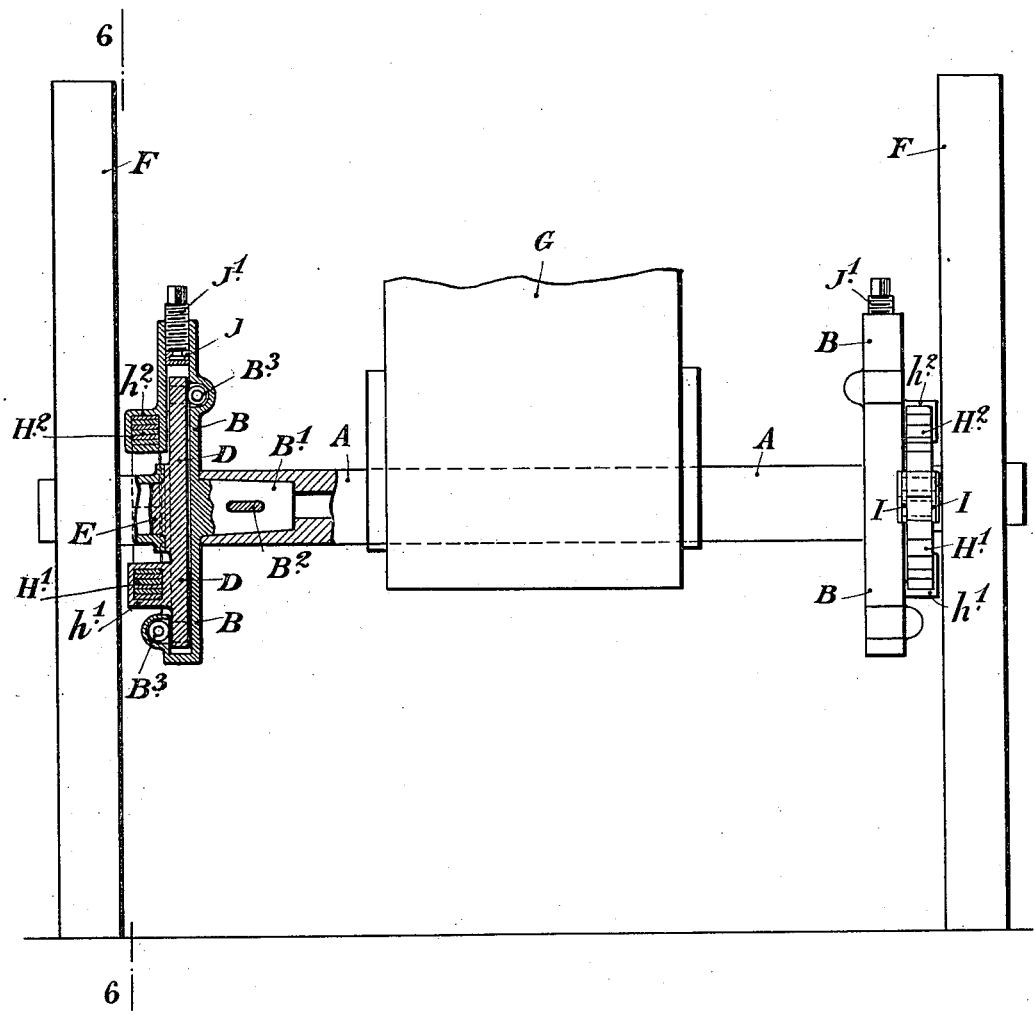
Figure 6:
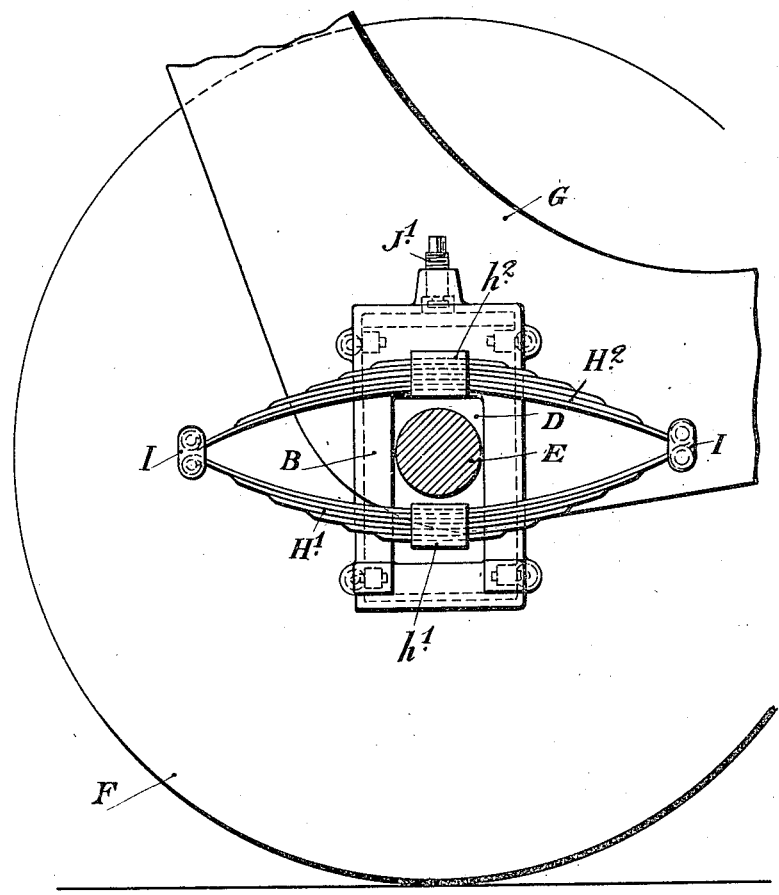
Figure 8:
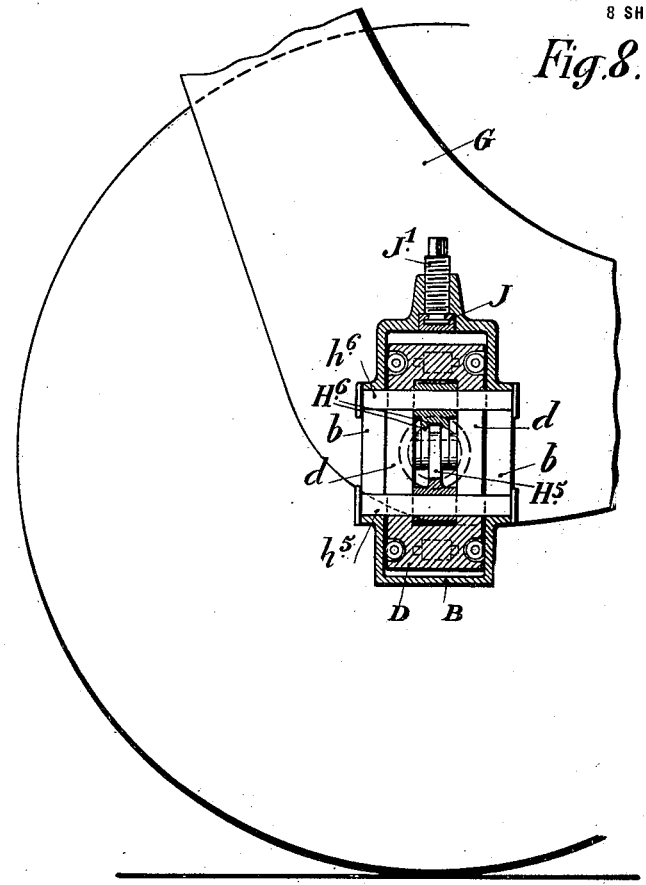
Figure 10:
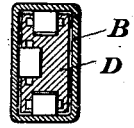

Figs. 5 and 6 are respectively a side elevation, partly in longitudinal section; and a cross-section on the line 6—6 of Fig. 5.

Figs. 7, 8, 9 and 10 illustrate another constructional example respectively in partial longitudinal section, a cross-section on the line 8—8 of Fig. 7 and horizontal sections on the lines 9—9 and 10—10 of Fig. 7.

Figure 11:
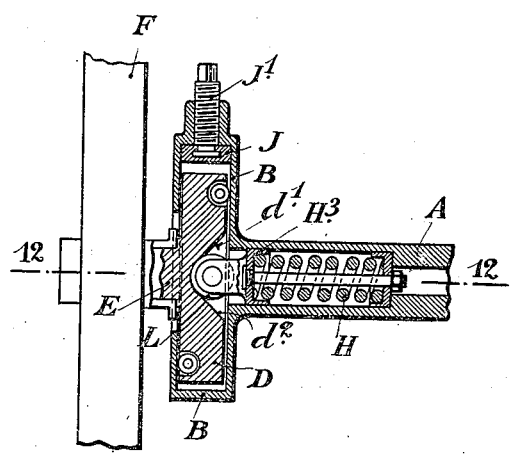
Figure 12:
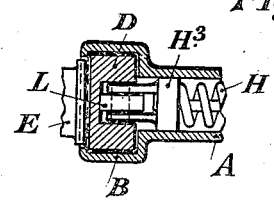

Figs. 11 and 12 are respectively a partial longitudinal section, and a horizontal section on the line 12—12 of Fig. 11, of another modification.

Figure 13:
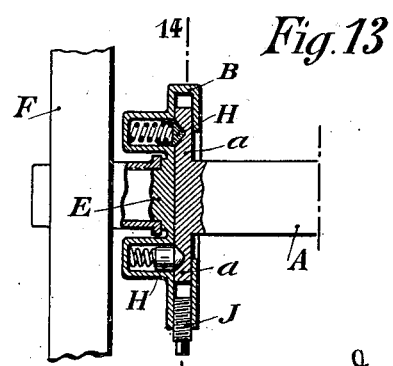
Figure 14:
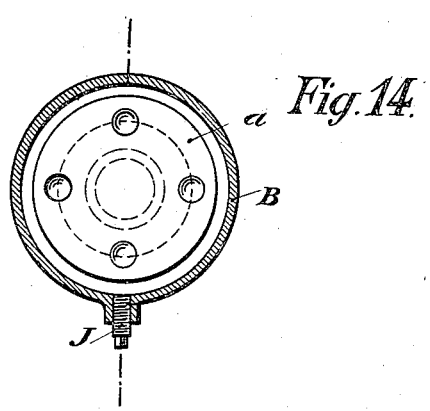

Figs. 13 and 14 are respectively a partial longitudinal section, and a cross-section on the line 14—14 of Fig. 13, of another constructional example.

Figure 15:
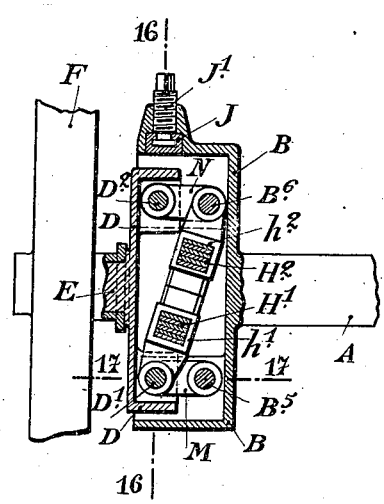
Figure 16:
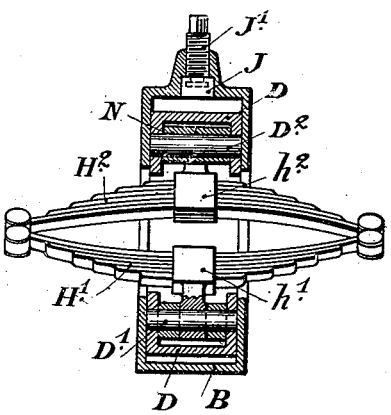
Figure 17:
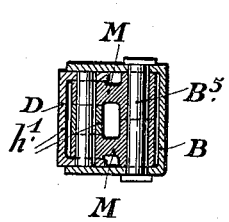

Figs. 15, 16 and 17 are respectively a partial longitudinal section, a cross-section on the line 16—16, and a horizontal section on the line 17—17 of Fig. 15 of another constructional example.

Figure 18:
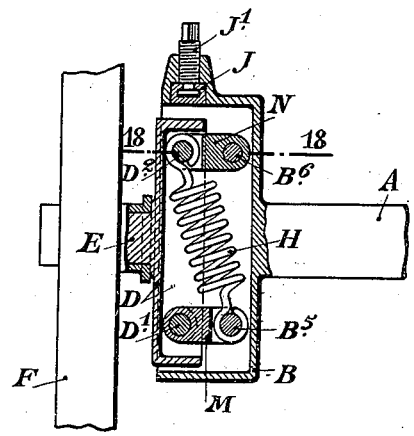
Figure 19:
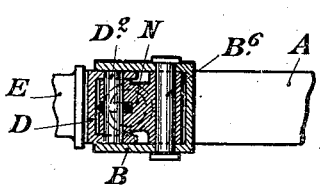

Figs. 18 and 19 are respectively a partial longitudinal section, and a horizontal section on the line 19—19 of another modification.

According to this invention the improved wheeled axle comprises a main axle portion A provided at each end with a guide box B for a slide block D formed on an axle journal E which is independent of the main portion A, and on which the corresponding wheel F is adapted to rotate. The improved axle comprises, briefly stated, a main portion B—A—B and two independent journals E—D, the latter being constructed in such a manner as to slide vertically in the ends of the main axle portion.

In this first example the elastic suspension of the carriage body G is effected by the interposition of a spring between the said carriage body and the slide blocks D formed on the axle journals E. As shown, a single laminated spring H may be employed, the longest plate of which is jointed at its ends by means of the links I to the slide blocks D. The central buckle of the laminated spring is attached normally, that is to say, during the travel of the vehicle, to the carriage body G which is carried directly by the main axle portion A. This attachment may be effected for example by means of a bolt O. As shown in Fig. 1, the guide boxes B, instead of being formed directly on the main axle portion, may be attached to the latter, and may be provided for this purpose with a truncated conical projection $B^1$ fitting into a corresponding recess in the main portion A and fixed to the latter by means of a key $B^2$. The boxes may, as shown in Figs. 1, 3 and 4 carry rollers $B^3$ and $B^4$ against which bear the faces of the slide blocks D for the purpose of facilitating the guiding movement and avoiding jamming or seizing.

Since in the example shown the invention is applied to a gun carriage, it is necessary to be able during firing to obviate the possibility of the main axle portion A becoming displaced relatively to the journals E—D. For this purpose each of the boxes B carries at the end of a screw-threaded spindle $J^1$, movable in the said box, a shoe J which is adapted to be pressed against the upper face of the slide block D in such a manner as to prevent its rising.

On the other hand when it is desired to train the gun by sliding the carriage body G along the axle A, the bolt O is withdrawn, and the part $D^1$ that serves for the attachment of links I (Figs. 1 and 4), is depressed relatively to the slide blocks D by operating the tightening device K in the requisite direction. The spring H can then expand freely without constituting an obstacle to the sliding of the carriage body along the axle.

In the modification shown in Figs. 5 and 6 the elastic device interposed between the main axle portion B—A—B and the journals E—D, comprises two pairs of laminated springs arranged transversely to the axle. Each of the slide blocks D carries the buckle $h^1$ of a spring $H^1$. The spring $H^2$ which is "conjugated" with the latter, has its buckle $h^2$ formed on the corresponding guide box B. The longest plates $H^1$ and $H^2$ are connected together by links I.

In the example shown in Figs. 7 to 10, A designates as before the main axle portion which is provided at its ends with guide boxes B for the slide blocks D formed on the axle journals E. In this construction the rollers for facilitating the guiding and avoiding jamming are carried by the slide blocks. The elastic device interposed between the journals E—D and the main axle portion A, comprises, for each journal, a coiled spring H bearing at one end against the bottom of a recess formed in the main axle portion A, and its other end against a cup $H^3$ movable in the said recess. Connecting links $H^5$ and $H^6$ are pivoted on the pivot pin $H^4$ carried by the said cup. The other ends of these links carry pivot pins $h^5$ and $h^6$ that are movable in guide slots $d$ formed in the slide block D, and also in the guide slots $b$ formed in the guide box B. When the wheel F receives an upwardly directed shock, the journal E carries with it the slide block D, and through the latter, the pivot pin $h^5$, with the result of displacing the pivot $H^4$ to the right, and compressing the spring H.

Inversely, if the wheel F should encounter a depression, the load acting through the main axle portion A, will tend to depress the box B relatively to the slide block D. The box B depresses the pivot pin $h^6$ in the guide slots $b$ and $d$; this having likewise the result of displacing the pivot pin $H^4$ to the right and compressing the spring H.

In the modification shown in Figs. 11 and 12, as in the preceding example, the elastic device interposed between the main axle portion B—A—B and the journals E—D, comprises at each end of the main axle portion, a coiled spring H arranged exactly as in the preceding example. In this arrangement the cup $H^3$ against which the outer end of the spring bears, carries through the medium of a fork, a roller L that is movable in a recess in the slide block D in contact with two inclined planes $d^1$, $d^2$.

It will be readily perceived that whichever may be the direction of the movement of the slide block D relatively to the box B, the roller L is forced inward, compressing the spring H.

Figs. 13 and 14 show a constructional example wherein the mutual guidance between the main axle portion A and the journals E, is effected by the arrangement of a disk $a$ at each end of the main axle portion, movable in a box B formed on the journal. The elastic device interposed between the main axle portion and the journals comprises in this arrangement a series of spring studs H whose conical heads are normally engaged in recesses of corresponding shape formed in the disk $a$.

On shock occurring, the plate $a$ slides in the box B owing to the compression of the springs of the studs H and the expansion of these springs has a constant tendency to return the parts into the normal position shown in these figures.

Figs. 15, 16 and 17 show a constructional example comprising a slide box D formed on each journal E and movable vertically in a box B fixed to the main axle portion A. The interposed elastic device comprises a pair of laminated springs $H^1$, $H^2$, of which the longest plates are connected together at their ends. The buckle $h^1$ of the spring $H^1$ is pivoted on a pivot pin $D^1$ carried by the slide block D. This pivot pin is in turn connected by links M to a pivot pin $B^5$ carried by the box B. The buckle $h^2$ of the spring $H^2$ is pivotally jointed by means of a projection to a pivot pin $B^6$ carried by the box B. On this pivot pin there is pivoted on the other hand one end of the links N, the other ends of which are pivoted on a pivot pin $D^2$ carried by the slide block D.

If the wheel F should receive an upwardly directed shock, it will carry with it in the same direction the slide block D which compresses the springs $H^1$ and $H^2$, thus producing a slight rotation of the links M and N in the upward direction. If, on the contrary, by reason of the wheel F dropping into a depression in the ground, the axle A should have a tendency to move down, it will carry with it the axle pins B⁵ and B⁶, and a compression of the springs will take place with a slight rotation of the links M and N in the downward direction.

Figs. 18 and 19 show a modification of the example just hereinbefore described.

In this construction the slide block D carries, as in the preceding example, two axle pins D¹ D² connected by links M and N respectively to the pivot pins B⁵ and B⁶ that are carried by the box B which is fixed to the main axle portion A. A coiled spring H is attached at one end to the pivot pin D² carried by the slide block, and its other end to the pivot pin B⁵ carried by the box B. Any relative motion between the slide block D and the box B will cause an extension of the spring H with a slight rotation of the links M and N, around the pivot pins D¹ and D² in one case, and around the pivot pins B⁵ and B⁶ in the other case.

In all the hereinbefore described constructional examples the two wheels are capable of oscillating vertically independently of each other.

What I claim is:

1. The combination with a wheeled axle for gun carriages and other vehicles, comprising a main axle portion carrying the load and journals at the ends of said portion carrying the wheels, a mutual vertical guide between each journal and the main axle portion, and an elastic device normally interposed between the load carried by the main axle portion and the journals, of means for transmitting the load of the main axle portion directly to the journals without the interposition of the elastic device.

2. The combination with a wheeled axle for gun carriages and other vehicles, comprising a main axle portion carrying the load and journals at the ends of said portion carrying the wheels, a mutual vertical guide between each journal and the main axle portion comprising a casing fixed to one of said members and a plate fixed to the other of said members and vertically slidable in said casing, and an elastic device normally interposed between the load carried by the main axle portion and the journals, of a retractable element mounted in the casing to bear on the plate for transmitting the load of the main axle portion directly to the journals without the interposition of the elastic device.

3. The combination with a wheeled axle for gun carriages and other vehicles, comprising a main axle portion carrying the load and journals at the ends of said portion carrying the wheels, a mutual vertical guide between each journal and the main axle portion comprising a casing fixed to the main axle portion and a plate fixed to the journal and vertically slidable in said casing, and an elastic device normally interposed between the load carried by the main axle portion and the journals, of a set-screw turned into each casing to bear on the plate therein to transmit the load of the main axle portion directly to the journals without the interposition of the elastic device.

4. The combination with a wheeled axle for gun carriages and other vehicles, comprising a main axle portion and journals at the ends of said portion carrying the wheels, a chassis to carry the load mounted on the main axle portion, and a mutual vertical guide between each journal and the main axle portion, of a spring connecting both journals and attached between the journals to the chassis to absorb shock imparted to the wheels or to the chassis and to permit relative movement between the main axle portions and the journals.

5. The combination with a wheeled axle for gun carriages and other vehicles, comprising a main axle portion and journals at the ends of said portion carrying wheels, a chassis to carry the load mounted on the main axle portion, and a mutual vertical guide between each journal and the main axle portion, of a spring connecting the chassis with both journals and normally operating to absorb shock imparted to the wheels or to the chassis and to permit relative movement between the main axle portion and the journals, and means for transmitting the load of the main axle portion directly to the journals without the interposition of the spring.

6. The combination with a wheeled axle for gun carriages and other vehicles, comprising a main axle portion and journals at the ends of said portion carrying wheels, a chassis to carry the load mounted on the main axle portion, and a mutual vertical guide between each journal and the main axle portion comprising a casing fixed to one of said members and a plate fixed to the other of said members and vertically slidable in said casing, of a spring connecting the chassis with both journals and normally operating to absorb shock imparted to the wheels or to the chassis and to permit relative movement between the casings and plates, and means for preventing relative movement between the casings and their respective plates to transmit the load of the main axle portion directly to the journals without the interposition of the spring.

7. The combination with a wheeled axle for gun carriages and other vehicles, comprising a main axle portion and journals at the ends of said portion carrying wheels, a chassis to carry the load mounted on the main axle portion, and a mutual vertical guide between each journal and the main axle portion comprising a casing fixed to one of said members and a plate fixed to the other of said members and vertically slidable in said casing, of a spring connecting the chassis with both journals and normally operating to absorb shock imparted to the wheels or to the chassis and to permit relative movement between the casings and plates, and a retractable element mounted in each casing to bear on the plate therein to prevent relative movement between said casing and plate to transmit the load of the main axle portion directly to the journals without the interposition of the spring.

8. The combination with a wheeled axle for gun carriages and other vehicles, comprising a main axle portion and journals at the ends of said portion carrying wheels, a chassis to carry the load mounted on the main axle portion, and a mutual vertical guide between each journal and the main axle portion comprising a casing fixed to one of said members and a plate fixed to the other of said members and vertically slidable in said casing, of a spring connecting the chassis with both journals and normally operating to absorb shock imparted to the wheels or to the chassis and to permit relative movement between the casings and plates, and a set-screw turnable in each casing to bear on the plate therein to prevent relative movement between said casing and plate to transmit the load of the main axle portion directly to the journals without the interposition of the spring.

9. The combination with a wheeled axle for gun carriages and other vehicles, comprising a main axle portion and journals at the ends of said portion carrying wheels, a chassis to carry the load slidable along the main axle portion, and a mutual vertical guide between each journal and the main axle portion, of a spring connected with the chassis and connected at its ends to both journals and normally operating to absorb shock imparted to the wheels or to the chassis, the connection between the spring and chassis being detachable to permit release of the chassis to slide along the main axle portion, and adjustable means for transmitting the load of the main axle portion directly to the journals without the interposition of the spring.

10. The combination with a wheeled axle for gun carriages and other vehicles, comprising a main axle portion and journals at the ends of said portion carrying wheels, a chassis to carry the load slidable along the main axle portion, and a mutual vertical guide between each journal and the main axle portion comprising a casing fixed to the main axle portion and a plate fixed to the journal and vertically slidable in said casing, of a spring connected with the chassis and connected at its ends to the plates fixed to the journals and normally operating to absorb shock imparted to the wheels or to the chassis, the connection between the spring and chassis being detachable to permit release of the chassis to slide along the main axle portion, and a retractable element mounted in each casing to bear on the plate therein to prevent relative movement between said casing and plate to transmit the load of the main axle portion directly to the journals without the interposition of the spring.

11. The combination with a wheeled axle for gun carriages and other vehicles, comprising a main axle portion and journals at the ends of said portion carrying wheels, a chassis to carry the load slidable along the main axle portion, and a mutual vertical guide between each journal and the main axle portion comprising a casing fixed to the main axle portion and a plate fixed to the journal and vertically slidable in said casing, of a spring detachably connected with the chassis to permit the release of said chassis to slide along the main axle portion, adjustable connections between the ends of the spring and said plates to permit depression of the spring to clear the chassis when released from the same, and a retractable element mounted in each casing to bear on the plate therein to prevent relative movement between said casing and plate to transmit the load of the main axle portion directly to the journals without the interposition of the spring.

12. The combination with a wheeled axle for gun carriages and other vehicles, comprising a main axle portion and journals at the ends of said portion carrying the wheels, a chassis to carry the load mounted on the main axle portion, a limited mutual vertical guide between each journal and the main axle portion, of a spring attached at its ends to the journals and detachably connected intermediate of its ends to the chassis so that the load can be transmitted from the chassis to the journals either by the main axle portion or by the spring.

In testimony whereof I have signed this specification.

EUGÈNE SCHNEIDER.

Witnesses:
  ANDRE MOSTICKER,
  LOUIS GARDET.